United States Patent [19]

Imazeki et al.

[11] 4,456,962

[45] Jun. 26, 1984

[54] TRACER CONTROL SYSTEM

[75] Inventors: Ryoji Imazeki; Etsuo Yamazaki, both of Hachioji, Japan

[73] Assignee: Fujitsu Fanuc Limited, Tokyo, Japan

[21] Appl. No.: 358,221

[22] Filed: Mar. 15, 1982

Related U.S. Application Data

[63] Continuation of Ser. No. 131,791, Mar. 19, 1980, abandoned.

[51] Int. Cl.³ .................... G06F 15/46; G05B 19/42
[52] U.S. Cl. .................................. 364/520; 318/571; 318/578; 364/474
[58] Field of Search .............. 364/474, 475, 520; 318/571, 578, 579, 162; 409/79, 98, 99, 126, 127, 130, 184, 210, 218, 69; 33/174

[56] References Cited

U.S. PATENT DOCUMENTS

| | | | |
|---|---|---|---|
| 3,559,021 | 1/1971 | Bingham, Jr. | 318/578 X |
| 3,579,069 | 5/1971 | Reuteler et al. | 318/578 X |
| 3,611,874 | 10/1971 | Larsen et al. | 318/578 X |
| 3,875,382 | 4/1975 | Cutler | 318/571 X |
| 4,084,244 | 4/1978 | Floter | 318/578 X |
| 4,224,670 | 9/1980 | Yamazaki | 364/474 |

Primary Examiner—Joseph F. Ruggiero
Attorney, Agent, or Firm—Staas & Halsey

[57] ABSTRACT

In a system which performs tracer control by calculating the direction and velocity of tracing using signals from a tracer head tracing the model surface, there are provided an input unit for entering data defining the tracing operation, a memory for storing the data and a processor for reading out the data from the memory to control respective parts of a control device. Of the data defining the tracing operation, stored in the memory, data concerning the reference displacement of the tracer head is read out by the processor to change the reference displacement for each profile modeling operation, thereby automatically performing repetitive tracing.

2 Claims, 5 Drawing Figures

TRACER CONTROL SYSTEM

This is a continuation, of application Ser. No. 131,791 filed Mar. 19, 1980, abandoned.

BACKGROUND OF THE INVENTION

1. Field of the Invention

This invention relates to a tracer control system, and more particularly to a tracer control system which automatically modifies the deflection of a tracer head for each machining operation to thereby permit continuous tracing from rough to finish machining without interruption.

2. Description of the Prior Art

In a tracer control system which calculates the direction and velocity of tracing through utilization of signals from a tracer head tracing the model surface, it is the general practice in the art to use different deflection values of the tracer head for rough and finish machining operations so as to reduce the overall machining time and to provide for enhanced accuracy in the machining operations. In the prior art, however, since the alteration of the deflection is carried out by means for applying a voltage such as a potentiometer or mechanical means, a manual operation is needed for each alteration, which makes it difficult to perform machining operations continuously from rough to finish machining.

SUMMARY OF THE INVENTION

In view of the abovesaid drawback of the prior art, the present invention is to provide a tracer control system in which data concerning the deflection of the tracer head are prestored in a memory and, based on the data, the deflection is automatically modified to permit continuous machining operations from rough to finish machining without an interruption, thereby reducing the entire machining time.

Briefly stated, in the trcer control system of the present invention, data on the deflection of the tracer head are prestored in a memory and read out therefrom by a processor to alter the deflection for each profile modeling operation; a comparison is made between a composite displacement signal derived from the displacement signals from the tracer head and a deflection signal to obtain a signal corresponding to the difference therebetween; and the tracer control is carried out in accordance with this difference signal.

DETAILED DESCRIPTION OF THE PREFERRED EMBODIMENTS

Figure 1:
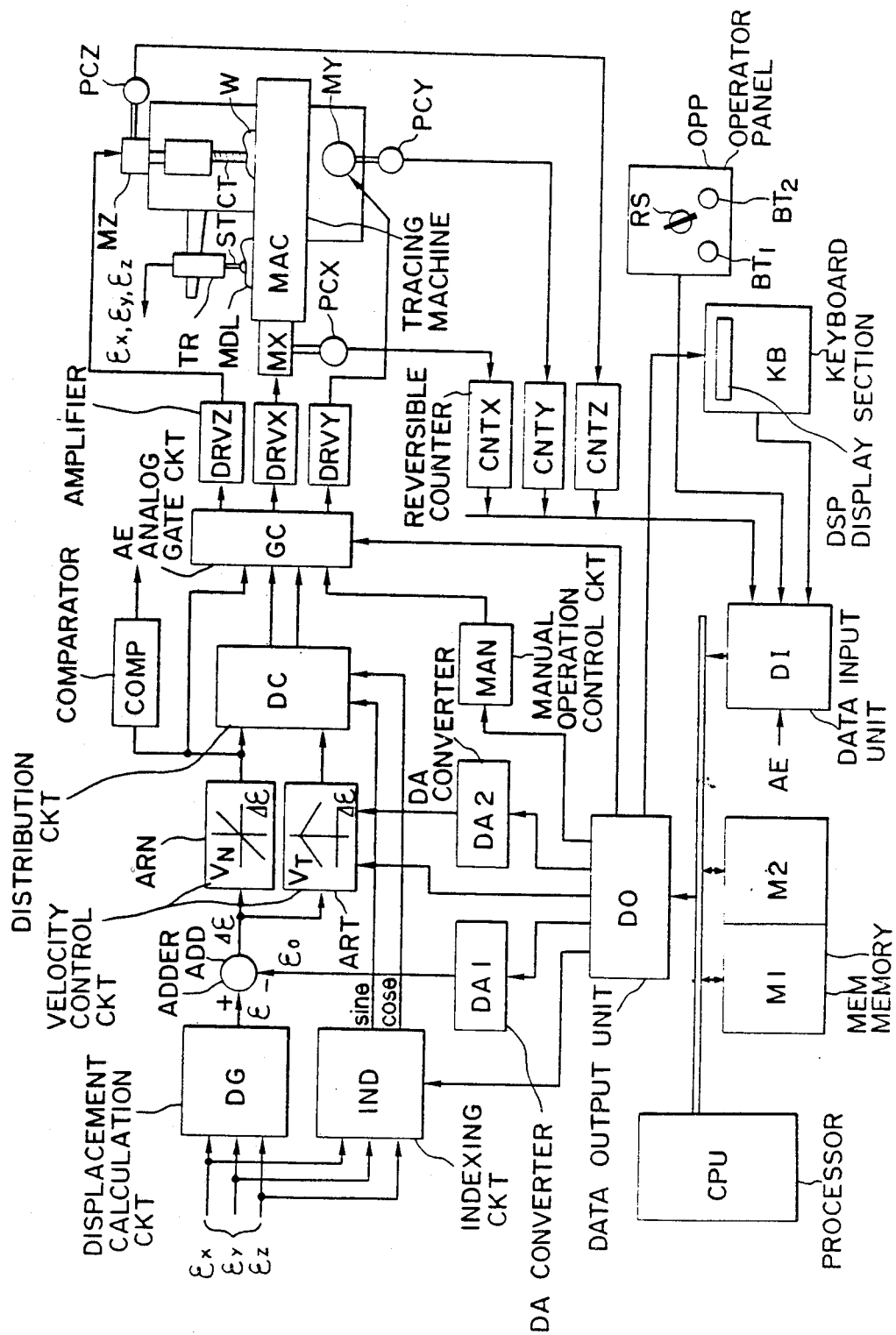
FIG. 1 is a block diagram illustrating an embodiment of the present invention.

FIG. 1 is a block diagram illustrating an embodiment of a tracer control system of the present invention. In FIG. 1, reference characters DG and IND respectively indicate a displacement calculation circuit and an indexing circuit which are supplied with displacement signals $\epsilon_x$, $\epsilon_y$ and $\epsilon_z$ from a tracer head TR; ARN and ART designate velocity control circuits; ADD identifies an adder; DC denotes a distribution circuit; COMP represents a comparator; GC shows an analog gate circuit; DRVX, DRVY and DRVZ refer to amplifiers; MX, MY and MZ indicate servo motors; PCX, PCY and PCZ designate position detectors; MDL identifies a model; ST denotes a stylus; CT represents a cutter; W shows a work; MAC refers to a tracing machine; CNTX, CNTY and CNTZ indicate reversible counters which count pulses from the position detectors to indicate the current position of the stylus; OPP designates an operator panel; RS identifies a dial for setting velocity or the like; BT1 and BT2 denote push buttons; KB represents a keyboard; DSP shows a display; DI refers to a data input unit; MEM indicates a memory composed of a data memory part M1 and a control program part M2; DO designates a data output unit; CPU identifies a processor; DA1 and DA2 denote D-A converters; and MAN represents a manual operation control circuit.

The stylus ST held in contact with the surface of the model MDL is fed by the servo motors and the displacement calculation circuit DG derives a composite displacement (actual deflection) signal $\epsilon = \sqrt{\epsilon_x^2 + \epsilon_y^2 + \epsilon_z^2}$ from displacement signals $\epsilon_x$, $\epsilon_y$ and $\epsilon_z$ corresponding to the displacement of the stylus ST, and the indexing circuit IND provides direction-of-displacement signals $\sin \theta$ and $\cos \theta$. The composite displacement signal $\epsilon$ is applied to the adder ADD to obtain a difference $\Delta\epsilon$ between the composite signal $\epsilon$ and a deflection signal $\epsilon_0$, which difference $\Delta\epsilon$ is provided to the velocity control circuits ARN and ART to obtain a normal-direction velocity signal $V_N$ and a tangential-direction velocity signal $V_T$. These signals $V_N$ and $V_T$ are applied to the distribution circuit DC to yield a velocity command signal in accordance with the direction-of-displacement signals $\sin \theta$ and $\cos \theta$, and the velocity command signal thus obtained is supplied to the analog gate circuit GC. The velocity command signal is then provided to that one of the amplifiers DRVX, DRVY and DRVZ which is selected by the analog gate circuit GC. By the velocity command signal, the servo motor corresponding to the selected amplifier is driven to feed the cutter CT and the tracer head TR is ganged relation to each other. The operations described above are already well-known in the art.

In the present embodiment, tracing operation data including data on the deflection is entered from the keyboard KB or the like for storage in the memory MEM, from which the data is read out as the tracing operation proceeds, and in accordance with the data, the deflection and the tracing path of the working are controlled. That is, the present embodiment permits continuous machining operations from rough to finish machining by automatically changing the deflection for each machining operation in accordance with the stored data concerning the deflection, without involving such a manual operation as is needed in the prior art. As the input data, use can be made of such, for example, as shown in the following tables.

TABLE 1

| Item | Symbol | Code |
| --- | --- | --- |
| Mode | (see Table 2) | A01 |
| Deflection (Initial value) | $\epsilon_0$ | A02 |
| Deflection | $\Delta\epsilon_0$ | A03 |

TABLE 1-continued

| Item | Symbol | Code |
|---|---|---|
| (Increased or decreased value) | | |
| Approach Axis | X, Y, Z | AO4 |
| Direction of Approach | +, − | AO5 |
| Approach Velocity | $V_{AP}$ | F1 |
| Direction of tracing | +, − | AO5 |
| Tracing Velocity | $V_{TF}$ | F2 |
| Direction of Pick Feed | +, − | |
| Pick Feed Velocity | $V_{PF}$ | F3 |
| Pick Feed Value | P | AO6 |
| Tracing Turning Position | $L_P$ | X1 |
| " | $L_N$ | X2 |
| Tracing End Position | $L_{TE}$ | Y1 |
| Automatic Return | ON, OFF | AO7 |
| Automatic Return Velocity | $V_{AR}$ | F4 |
| Automatic Return Position | $L_{RP}$ | Z1 |

TABLE 2

| Mode | Sub-Mode |
|---|---|
| 1 Manual Tracing | |
| 2 Both-ways Tracing | 45° Tracing |
| 3 One-Way Tracing | |
| 4 360 Deg. Tracing | Axial-Direction Pick |
| | Z-Axis Pick |
| 5 Partial Tracing | |
| 6 Three-Dimensional Tracing | |

Figure 2:
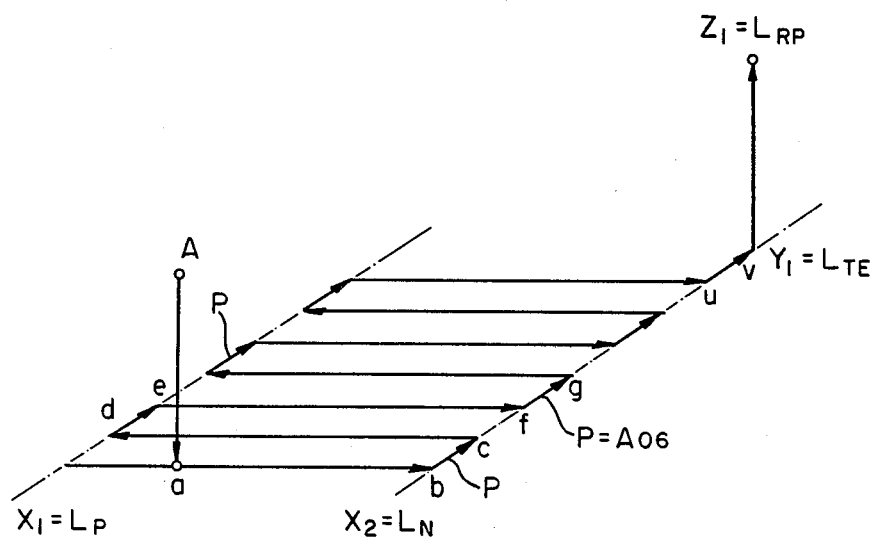
FIG. 2 is a schematic diagram explanatory of a tracing path.
Figure 3:
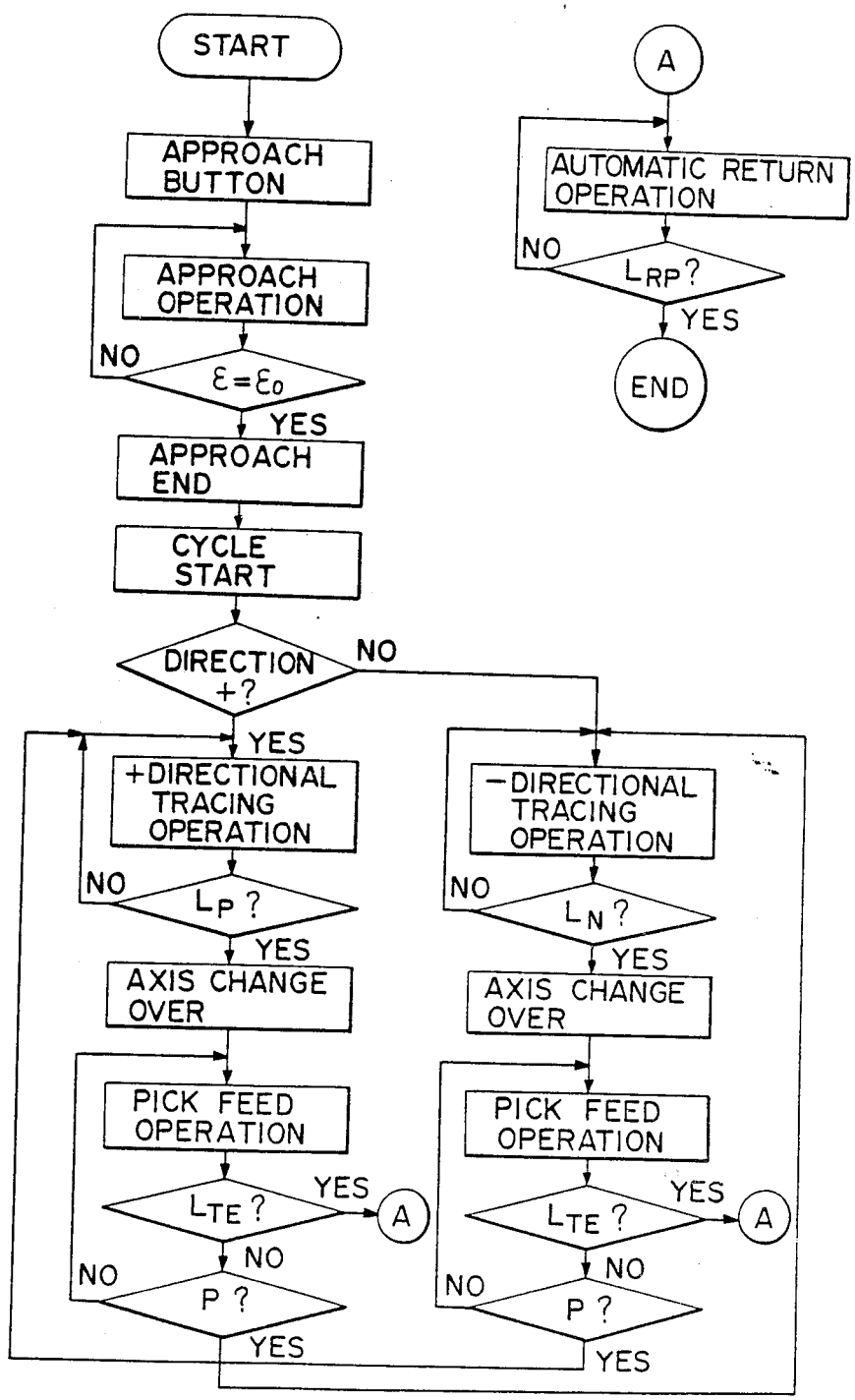
FIG. 3 is a flowchart explanatory of the operation of an embodiment of the present invention.

Turning now to FIG. 2, the tracer control by the present invention will be described. In FIG. 2, the tracing turning points $L_P$ and $L_N$ are X1 and X2; the pick feed value P is AO6; the tracing end position $L_{TE}$ is Y1; the automatic return position $L_{RP}$ is Z1; the deflection (an initial value) $\epsilon_0$ is AO2; and the stylus ST is controlled by the input data of the velocity and direction of tracing so that it approaches a point a from a starting point A and traces the model surface following a route [a-b-c- ... u-v] and then automatically returns from the tracing end position Y1 to the automatic return position Z1. In this case, the tracing operation is controlled following such a flowchart as depicted in FIG. 3.

Upon depression of an approach button (not shown), the processor CPU reads out data on the axis, direction and velocity of approach from the memory MEM and provides a signal via the data output unit DO to the analog gate circuit GC to activate the amplifier DRVZ, causing the servo motor MZ to lower the tracer head TR and the cutter CT. The velocity in this case can be determined by data supplied via the data output unit DO the the D-A converter DA2.

Before the stylus ST is brought into contact with the model MDL, the displacement signals $\epsilon_x$, $\epsilon_y$ and $\epsilon_z$ are zero, and accordingly the difference signal $\Delta\epsilon$ is equal to the deflection signal $\epsilon_0$. When the composite displacement signal $\epsilon$ has become equal to the deflection signal $\epsilon_0$ as a result of the contacting of the stylus ST with the model MDL, the comparator COMP detects that $\Delta\epsilon=0$, and applies an approach end signal AE to the data input unit DI. The approach end signal AE is read out by the processor CPU to detect the completion of approach, and then tracing is strated.

The processor CPU reads out data such as the mode, the deflection, the direction of tracing and the feedrate, for starting the tracer control. The deflection data is converted by the D-A converter DA1 into an analog deflection signal $\epsilon_0$ for input to the adder ADD, and the servo motor MX is driven in a direction following the direction-of-tracing data. Further, the processor CPU reads out the tracing turning positions $L_P$ and $L_N$ from the memory MEM and compares them with the content of the reversible counter CNTX representing the current position of the stylus ST.

For example, when tracing in the direction "−", when the content of the reversible counter CNTX and the tracing turning position $L_N$ match with each other, the axis is changed and the processor CPU reads out data such as the direction, velocity and quantity of pick feed P to control the pick feed. When the content of the reversible counter CNTY becomes equal to the pick feed P from the start of the pick feed operation, the processor CPU causes the stylus ST to turn, that is, controls it to trace in the direction "+". Further, the processor CPU checks whether the stylus ST has reached the tracing end position or not, and when detecting that the tracing end position $L_{TE}$ is reached during the pick feed operation, the processor CPU reads out the data, for example, of the automatic return ON, the automatic return velocity $V_{AR}$ and the automatic return position $L_{RP}$ from the memory MEM. Since the automatic return is ON, the servo motor MZ is driven and when the content of the reversible counter CNTZ indicates the automatic return position $L_{RP}$, this tracer control operation comes to an end.

Figure 4:
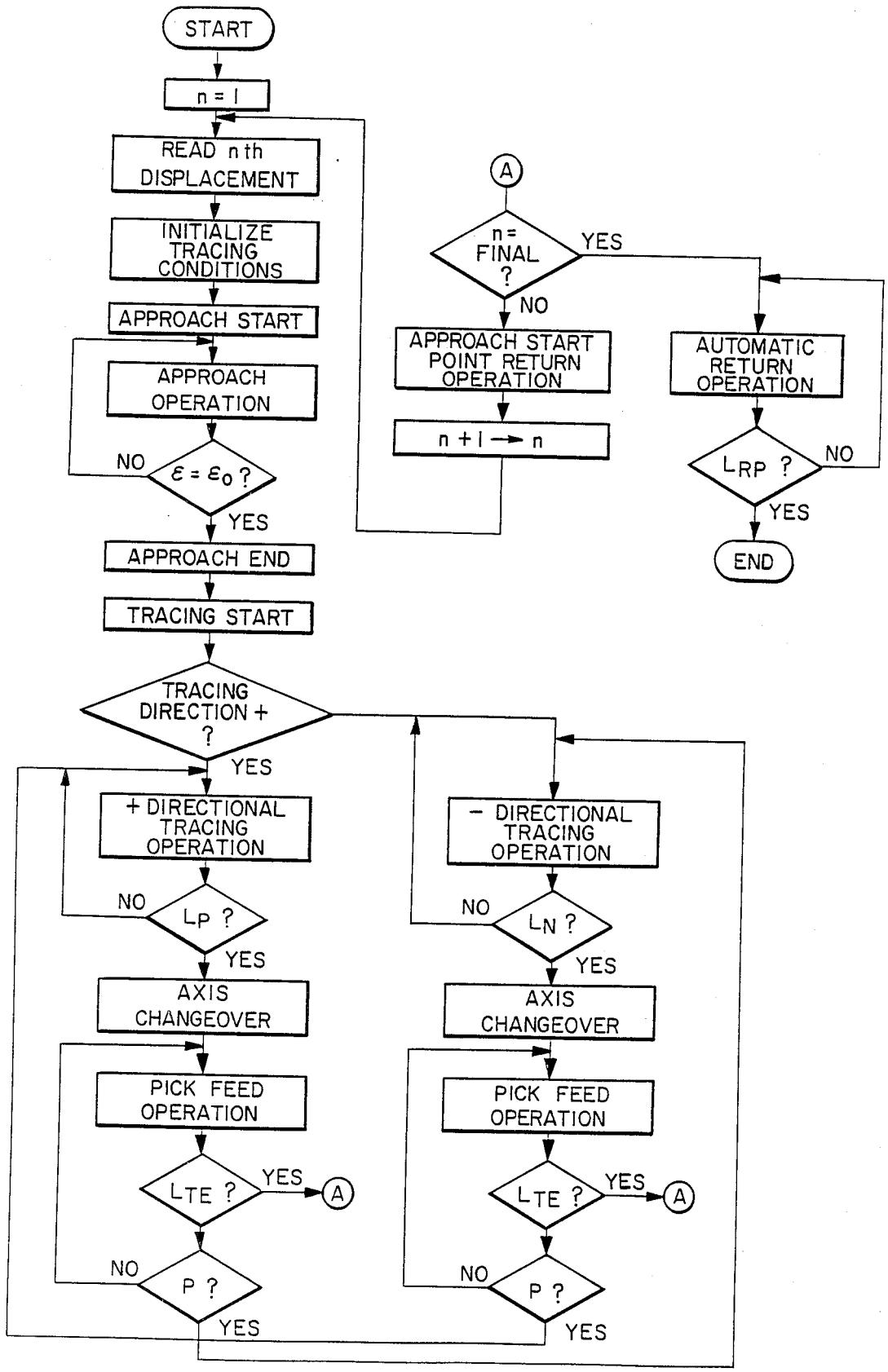
FIG. 4 is a flow chart explanatory of the operation of a further embodiment of the present invention.
Figure 5:
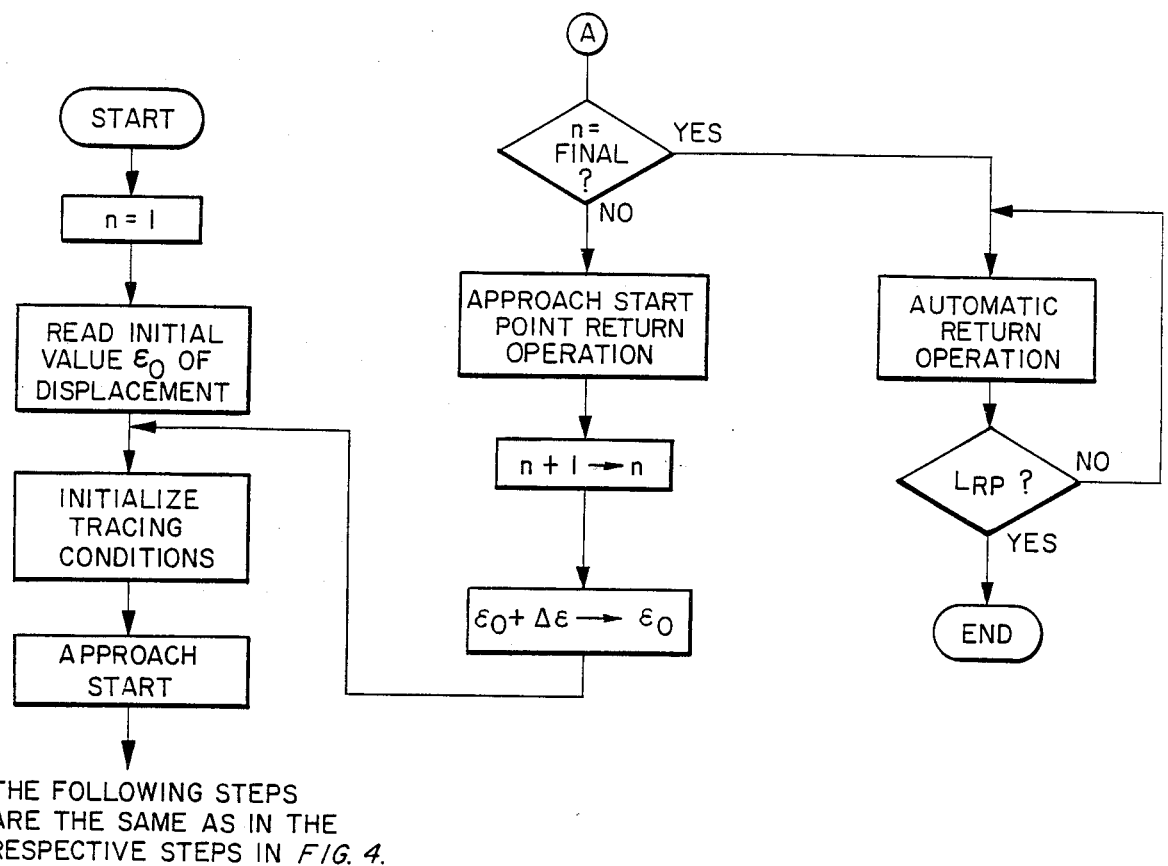
FIG. 5 is a flow chart explanatory of yet another embodiment of the present invention.

In the event that repetitive tracing has been preset by the input from the keyboard KB, the processor CPU returns the stylus ST by ordinary positioning control to the approach starting point A immediately following the automatic return operation, carrying out the tracing again. In this case, as illustrated in FIG. 4, the deflection is $\epsilon_0+\Delta\epsilon_0$ which is the sum of the deflection value (the initial value) $\epsilon_0$ and the deflection value (the increased or decreased value) $\Delta\epsilon_0$ both having been read out by the processor CPU and added together. Since the repetitive tracing can be effected by automatically changing the deflection for each working operation as described above, it is possible to achieve machining operations continuously from rough to finish machining, thereby markedly reducing the machining time. In this case, as illustrated in FIG. 5, it is also possible to prestore $\epsilon_{01}$ to $\epsilon_{0n}$ in the memory MEM and read out them one by one instead of adding $\Delta\epsilon$ to $\epsilon_0$ for each working. Further, by prestoring increased or decreased values of the pick feed and the tracer head feed rate in the memory, the pick feed and the tracer head feed rate can also be altered automatically in response to a change in the deflection, enabling more proper tracer control for rough and finish machining operations.

The tracing turning positions $L_P$ and $L_N$, the tracing end position $L_{TE}$, the automatic return position $L_{RP}$ and the pick feed P may also be obtained by writing in the memory MEM the contents of the reversible counters when the stylus ST is shifted to its respective positions in a manual feed mode, instead of entering the data from the keyboard KB.

Also during the tracing operation the deflection and the tracing path can be corrected by reloading the data in the memory MEM. For example, the data in the memory MEM are read out therefrom and displayed on the display DSP and the data are reloaded by the manipulation of the keyboard KB; thus, the deflection and so forth can be corrected with ease.

In the foregoing embodiment, all data defining the tracing operation are prestored in a memory for controlling the tracing operation, but in the present invention, all the data need not always be prestored; for example, the tracing turning position and the like may also be controlled by a limit switch.

As has been described above, the present invention permits repetitive tracing by automatically changing the deflection by a predetermined value for each working in accordance with prestored data for the deflection, and consequently machining operations can automatically be carried out continuously from rough to finish machining, resulting in the entire working time being greatly reduced.

It will be apparent that many modifications and variations may be effected without departing from the scope of the novel concepts of the present invention.

What is claimed is:

1. A method of performing a series of repeated tracing operations of the surface of a model, with a predetermined corresponding series of desired values for the deflection of the stylus of a tracer head, by calculating the direction and velocity of the tracer head for each tracing operation from signals corresponding to the displacement along respective machine axes of the stylus with respect to the tracer head, from which displacement signals the value of the actual deflection of the stylus is derived, said method comprising entering data defining said series of repeated tracing operations through an input unit for storage in a memory of said system, said data including data defining said series of desired deflection values corresponding to said series of repeated tracing operations, selectively reading out the data from the memory by a processor for performing said tracing operation of said repeated series thereof, inputting said displacement signals to an indexing circuit for supplying direction-of-displacement signals as outputs during each said repeated tracing operation, determining the actual value of said deflection and outputting the difference between the actual value and the respective predetermined desired deflection value for each said repeated tracing operation, by a difference means provided therefor, inputting said difference output from said difference means into normal and tangential velocity control circuits, for outputting normal and tangential tracing velocity components with respect to said surface being traced, for reducing said difference between the actual deflection and the respective predetermined desired deflection value during each said repeated tracing operation, inputting said outputs of the velocity control circuits and said direction-of-displacement signals into a distribution circuit, for outputting velocity command signals for performing each said repeated tracing operation with the respective predetermined desired value for deflection, and inputting said velocity command signals into an analog gate circuit for outputting respective signals controlling the motion of said tracer head along each of said machine axes, wherein said series of repeated tracing operations is performed with the predetermined corresponding series of desired values for said deflection, and said data defining said series of desired deflection values includes the initial and each subsequent desired value of the deflection for the initial and each subsequent tracing operation of said series of repeated tracing operations, respectively.

2. A method of performing a series of repeated tracing operations of the surface of a model, with a predetermined corresponding series of desired values for the deflection of the stylus of a tracer head, by calculating the direction and velocity of the tracer head for each tracing operation from signals corresponding to the displacement along respective machine axes of the stylus with respect to the tracer head, from which displacement signals the value of the actual deflection of the stylus is derived, said method comprising entering data defining said series of repeated tracing operations through an input unit for storage in a memory of said system, said data including data defining said series of desired deflection values corresponding to said series of repeated tracing operations, selectively reading out the data from the memory by a processor for performing said tracing operation of said repeated series thereof, inputting said displacement signals to an indexing circuit for supplying direction-of-displacement signals as outputs during each said repeated tracing operation, determining the actual value of said deflection and outputting the difference between the actual value and the respective predetermined desired deflection value for each said repeated tracing operation, by a difference means provided therefor, inputting said difference output from said difference means into normal and tangential velocity control circuits, for outputting normal and tangential tracing velocity components with respect to said surface being traced, for reducing said difference between the actual deflection and the respective predetermined desired deflection value during each said repeated tracing operation, inputting said outputs of the velocity control circuits and said direction-of-displacement signals into a distribution circuit, for outputting velocity command signals for performing each said repeated tracing operation with the respective predetermined desired value for deflection, and inputting said velocity command signals into an analog gate circuit for outputting respective signals controlling the motion of said tracer head along each of said machine axes, wherein said series of repeated tracing operations is performed with the predetermined corresponding series of desired values for said deflection, and said data defining said series of desired deflection values comprises an initial value for the desired deflection corresponding to the first of said repeated tracing operations in said series thereof, and the incremental difference in the desired deflection values between sucessive ones of said series of repeated tracing operations.

* * * * *

UNITED STATES PATENT AND TRADEMARK OFFICE
CERTIFICATE OF CORRECTION

PATENT NO.  : 4,456,962
DATED       : 26 June 1984
INVENTOR(S) : RYOJI IMAZEKI et al It is certified that error appears in the above-identified patent and that said Letters Patent is hereby corrected as shown below:

Column 1, line 39 "trcer" should be --tracer--.

Column 3, line 36 "a" , second occurrence, should be -- a --.
         line 61 "strated" should be --started--.

Column 4, line 43 "and read out them" should be --and to read them out--.

Column 6, line 63 "sucessive" should be --successive--.

Signed and Sealed this

Fourth Day of December 1984

[SEAL]

Attest:

GERALD J. MOSSINGHOFF

Attesting Officer

Commissioner of Patents and Trademarks